US010087825B2

(12) United States Patent
Maenpaa

(10) Patent No.: US 10,087,825 B2
(45) Date of Patent: Oct. 2, 2018

(54) DIGITAL WASTE GATE VALVE ARRANGEMENT AND METHOD OF OPERATING A DIGITAL WASTE GATE VALVE ARRANGEMENT IN AN INTERNAL COMBUSTION ENGINE

(71) Applicant: WARTSILA FINLAND OY, Vaasa (FI)

(72) Inventor: Janne Maenpaa, Vaasa (FI)

(73) Assignee: WÄRTSILÄ FINLAND OY, Vaasa (FI)

( * ) Notice: Subject to any disclaimer, the term of this patent is extended or adjusted under 35 U.S.C. 154(b) by 464 days.

(21) Appl. No.: 14/772,279

(22) PCT Filed: Mar. 5, 2013

(86) PCT No.: PCT/FI2013/050235
§ 371 (c)(1),
(2) Date: Sep. 2, 2015

(87) PCT Pub. No.: WO2014/135736
PCT Pub. Date: Sep. 12, 2014

(65) Prior Publication Data
US 2016/0003136 A1 Jan. 7, 2016

(51) Int. Cl.
*F02B 37/18* (2006.01)
(52) U.S. Cl.
CPC .......... *F02B 37/186* (2013.01); *F02B 37/183* (2013.01); *Y02T 10/144* (2013.01)
(58) Field of Classification Search
CPC ..... F02B 37/186; F02B 37/183; Y02T 10/144
(Continued)

(56) References Cited

U.S. PATENT DOCUMENTS 4,197,711 A * 4/1980 Fuhrmann ............... F02B 37/18
60/602
4,235,076 A * 11/1980 Meloche ................. F01N 3/20
60/280
(Continued)

FOREIGN PATENT DOCUMENTS

EP 0 137 282 A2 4/1985
EP 1 801 392 A2 6/2007
(Continued)

OTHER PUBLICATIONS

International Search Report dated Nov. 26, 2013 for International Application No. PCT/FI2013/050235.

*Primary Examiner* — Thai Ba Trieu
*Assistant Examiner* — Jessica Kebea
(74) *Attorney, Agent, or Firm* — Heslin Rothenberg Farley & Mesiti P.C.; Victor A. Cardona, Esq.

(57) ABSTRACT

A digital waste gate arrangement in an internal combustion piston engine has at least one turbocharger with a compressor part and a turbine part. A flow control unit has more than two individually controllable on-off valve units, and a pneumatic actuator system is arranged to control each on-off valve individually. At least one control gas inlet port is in connection with the pneumatic actuator system, which control gas inlet port is arranged in connection with a downstream side of a compressor part of the turbocharger via a control gas passage. The control gas for operating the flow control unit is arranged available for the pneumatic actuator sys-tem through the control gas passage.

7 Claims, 4 Drawing Sheets

Figure 1:
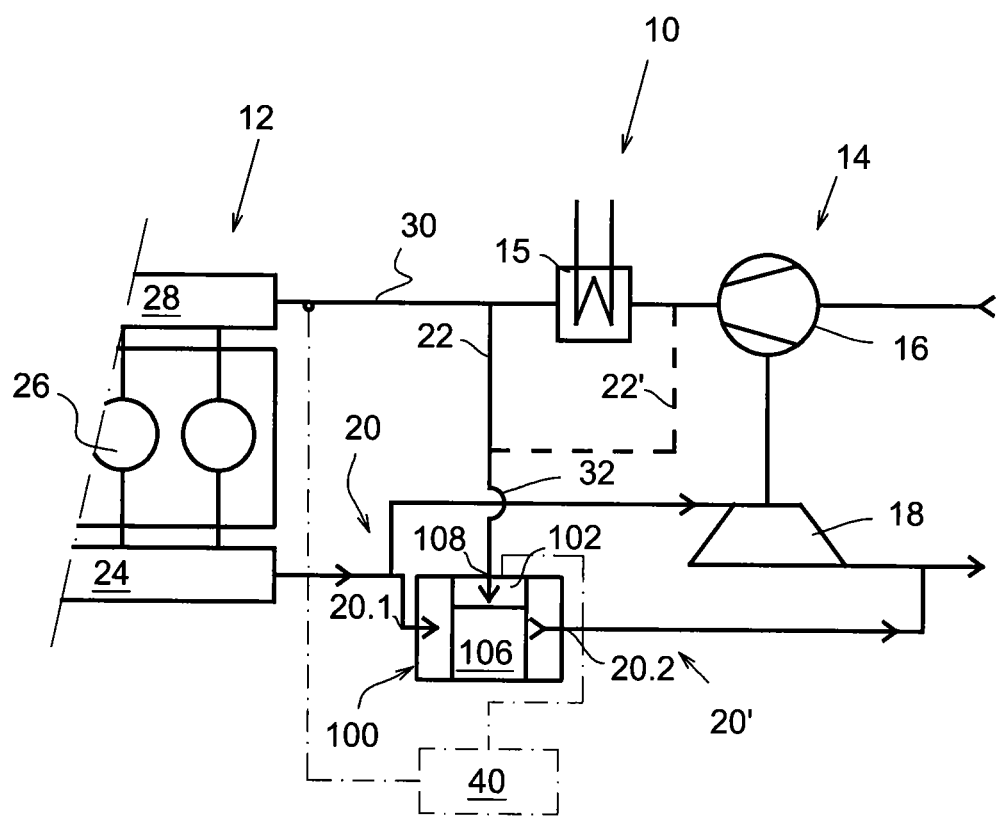

(58) Field of Classification Search
USPC .......................................................... 60/602
See application file for complete search history.

(56) References Cited

U.S. PATENT DOCUMENTS

| | | | | | |
|---|---|---|---|---|---|
| 4,424,675 | A * | 1/1984 | Ojima | ................... | F02B 37/186 |
| | | | | | 60/602 |
| 4,466,248 | A | 8/1984 | Nartowski | | |
| 4,513,571 | A * | 4/1985 | Jenny | ..................... | F02B 33/42 |
| | | | | | 60/603 |
| 4,597,264 | A * | 7/1986 | Cipolla | ................ | F02B 37/186 |
| | | | | | 60/602 |
| 4,745,752 | A * | 5/1988 | Suzuki | ................. | F01D 17/146 |
| | | | | | 60/602 |
| 4,768,544 | A | 9/1988 | Beam et al. | | |
| 6,295,814 | B1 * | 10/2001 | Schmidt | ............... | F02B 37/183 |
| | | | | | 123/564 |
| 6,898,933 | B2 * | 5/2005 | Klingseis | .............. | F02B 37/186 |
| | | | | | 60/602 |
| 7,877,997 | B2 * | 2/2011 | Gruel | .................... | F02B 37/186 |
| | | | | | 60/602 |
| 9,638,098 | B2 * | 5/2017 | Svihla | .................. | F02B 37/183 |
| 2011/0113775 | A1 * | 5/2011 | Lilly | ..................... | F02B 37/013 |
| | | | | | 60/605.2 |
| 2011/0120431 | A1 * | 5/2011 | Lilly | ...................... | F02M 26/48 |
| | | | | | 123/568.12 |
| 2011/0225967 | A1 | 9/2011 | Karnik et al. | | |
| 2016/0010540 | A1 * | 1/2016 | Norris | ................... | F02B 37/186 |
| | | | | | 60/602 |

FOREIGN PATENT DOCUMENTS

| | | | | |
|---|---|---|---|---|
| FR | 2843170 A1 * | 2/2004 | ............ | F02B 37/186 |
| WO | 2012175792 A1 | 12/2012 | | |
| WO | 2012175794 A2 | 12/2012 | | |
| WO | WO 2012175792 A1 * | 12/2012 | ................ | F01P 7/14 |
| WO | WO 2013121111 A1 * | 8/2013 | ............ | F16K 1/223 |

* cited by examiner

DIGITAL WASTE GATE VALVE ARRANGEMENT AND METHOD OF OPERATING A DIGITAL WASTE GATE VALVE ARRANGEMENT IN AN INTERNAL COMBUSTION ENGINE

CROSS REFERENCE TO RELATED APPLICATIONS

This application is a national stage filing under section 371 of International Application No. PCT/FI2013/050235, filed on Mar. 5, 2013, and published in English on Sep. 12, 2014, as WO 2014/135736 A1, the entire disclosure of this application being hereby incorporated herein by reference.

TECHNICAL FIELD

The present invention relates to a digital waste gate valve arrangement in an internal combustion piston engine having at least one turbocharger with a compressor part and a turbine part, and which digital waste gate arrangement comprises a flow control unit having more than two individually controllable on-off valve units, and which arrangement comprises pneumatic actuator system arranged to individually control each on-off valve.

The present invention relates to method of operating a digital waste gate valve arrangement in an internal combustion piston engine having at least one turbocharger with a compressor part and a turbine part, in the turbine part of the turbocharger unit energy of the exhaust gas is partially used for driving the compressor part and the operation of the turbine part is controlled by a digital waste gate arrangement controlled by a pneumatic actuator system.

BACKGROUND ART

The operational requirements of combustion engines are becoming more and more demanding and this the accuracy and reliability of control systems is ever more important. An extremely important fluid flow system in connection with an internal combustion piston engine is the charge air—exhaust gas flow system i.e. the engine gas exchange system. In the efficiently operating internal combustion piston engines, it is almost a rule to use charge air compressors, typically turbochargers, in connection with the engines. In order to operate the engine properly and efficiently over a wide load range means that control of the gas flow is needed at least to some extent. Therefore the turbo charger is often provided with a so called waste gate. The waste gate is a bypass channel over the turbine part of the turbocharger through which a controllable amount of exhaust as may be led without performing work in the turbine part of the turbo charger. The waste gate is typically provided with a mechanical valve, the opening or closure state of which is depending e.g. on the charge air pressure or the engine load. The valve is operating in a very harsh environment, where it is exposed to temperatures of several hundreds of Celsius degrees in exhaust gases flowing at very high velocities. Also in transient load stages the control on the turbocharger has considerable impact on the engine performance.

Different kinds of valve systems are disclosed in the following publications.

WO 2012/175794 A2 discloses a turbocharger and a gas flow system connecting a compressor part and a turbine part of the turbocharger unit with the engine, which gas flow system comprises at least one fluid flow control device arranged to control the flow of gas. The fluid flow control device is a digital valve system which comprises at least two parallel valve units each having two operational positions.

EP0137282 A2 discloses an EGR-system for controlling the amount of exhaust gas recirculation flow between an exhaust gas passage and the intake manifold. There is a plurality of solenoid actuated valves situated in a passage linking the exhaust gas system and the intake manifold. There is also disclosed a method comprising energizing a particular one or group of said solenoid responsive valves in a predetermined order such that the composite flow through said orifices is achieved.

U.S. Pat. No. 4,768,544A discloses a digital valve in which the valve units are operated by pneumatic piston cylinder, one of which is connected to each said valve units.

An object of the invention is to provide a digital waste gate valve arrangement and method of operating a digital waste gate valve arrangement which provides more reliable operation than prior art waste gas valve arrangements.

DISCLOSURE OF THE INVENTION

The objects of the invention are substantially met by a digital waste gate valve arrangement in an internal combustion piston engine having at least one turbocharger with a compressor part and a turbine part, and which digital waste gate arrangement comprises a flow control unit having more than two individually controllable on-off valve units, and which arrangement comprises pneumatic actuator system arranged to control each on-off valve individually. It is characteristic to the invention that the arrangement comprises at least one control gas inlet port in connection with the pneumatic actuator system, which control as inlet port is arranged in connection with a downstream side of a compressor part of the turbocharger via a control gas passage and that the control gas for operating the flow control unit is arranged available for the pneumatic actuator system through said control gas passage.

Using pressurized charger air of the engine as the control air is beneficial since the pressurized air is available when needed, and in cases the waste gate operation is needed the pressure and thus air flow which the compressor part is providing is excessive. So, even if the air flow rate used as the control air is considerably small, it is readily obtained by the compressor part.

According to an embodiment of the invention the pneumatic actuator system of the arrangement comprises a dedicated pneumatic actuator arranged for each valve unit of the digital waste gate arrangement and that each of the pneumatic actuators is in in connection with an inlet air passage a downstream side of a compressor part. The connection is arranged at a location upstream a cylinder head of the engine.

According to an embodiment of the invention each of the pneumatic actuators is in in connection with an inlet air receiver of the engine.

According to an embodiment of the invention pneumatic actuator system of the arrangement comprises a control system arranged for each pneumatic actuator, and each control system is provided with at least two control ports and an inlet port for each pneumatic actuator, and the control system is arranged for setting selectable flow connections between the at least one inlet port and the control ports.

According to an embodiment of the invention the control system comprises a control gas discharge port for discharging the used control gas.

According to an embodiment of the invention the control discharge port is provided with a check valve. Advantageously the check valve is arranged to have an opening threshold pressure. This way there is always a certain predetermined pressure level in the pneumatic actuator. Preferably the threshold pressure of the check valve is selected so that the pressure in the pneumatic actuator is higher than the pressure of the exhaust gas in the valve units. This minimizes leaking exhaust gas flow from the exhaust side to the actuator system.

According to an embodiment of the invention the control gas discharge port is arranged to be controllably set by the control system in a selectable flow connection to one of the control ports of said two control ports.

According to an embodiment of the invention that the actuator is a pneumatic piston actuator which comprises a spring which is arranged to urge the piston towards its valve closing direction. Advantageously the spring is selected so that the valve unit remains closed by the spring in the case no control gas is applied to the side of the piston opposite the spring.

Objects of the invention are also met by method of operating a digital waste gate valve arrangement in an internal combustion piston engine having at least one turbocharger with a compressor part and a turbine part, in the turbine part of the turbocharger unit energy of the exhaust gas is partially used for driving the compressor part and the operation of the turbine part is controlled by a digital waste gate arrangement controlled by a pneumatic actuator system. It is characteristic to the invention that while the engine is operated, charge air is pressurized by the compressor part and the pressurized charge air is used as a control gas operating the pneumatic actuator system of the digital waste gate arrangement.

BRIEF DESCRIPTION DRAWINGS

Figure 2:
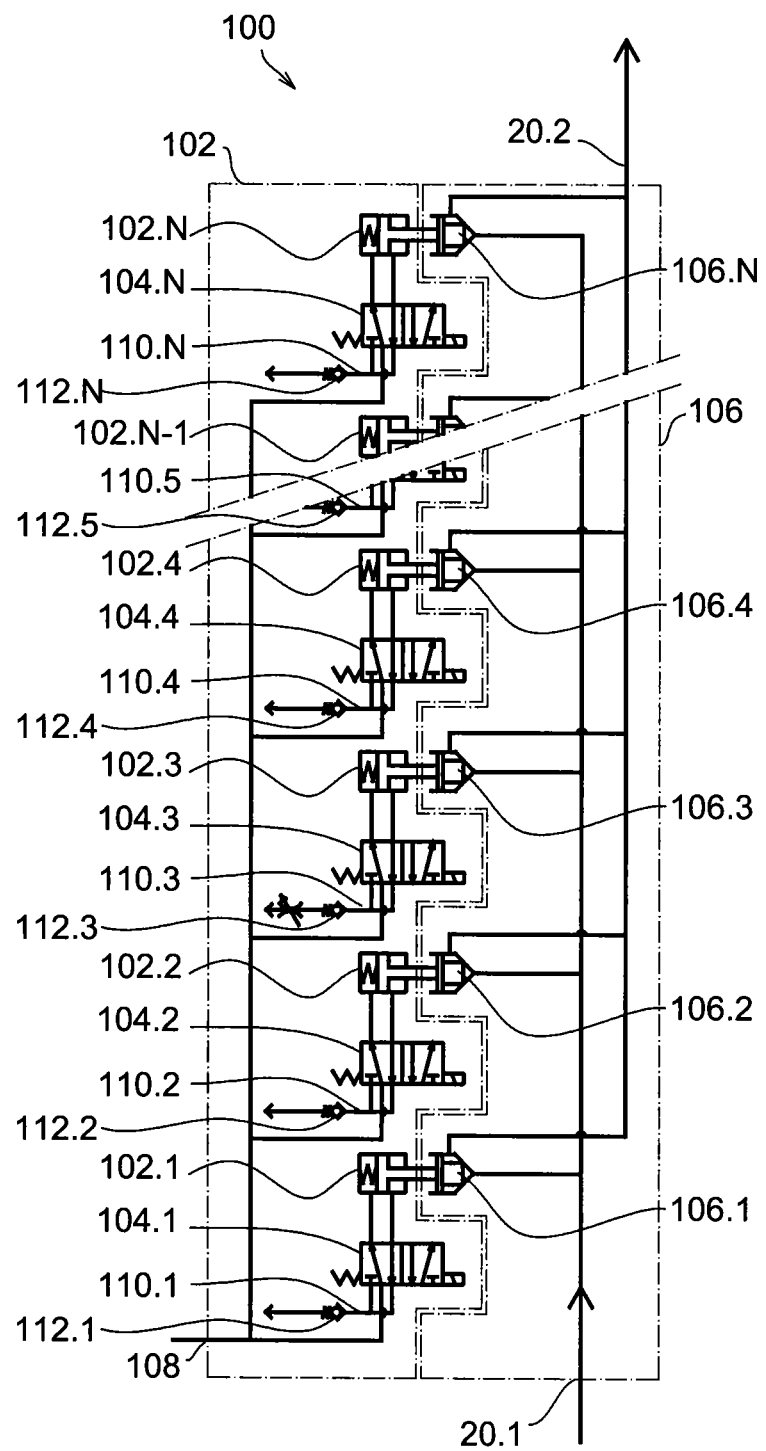
Figure 3:
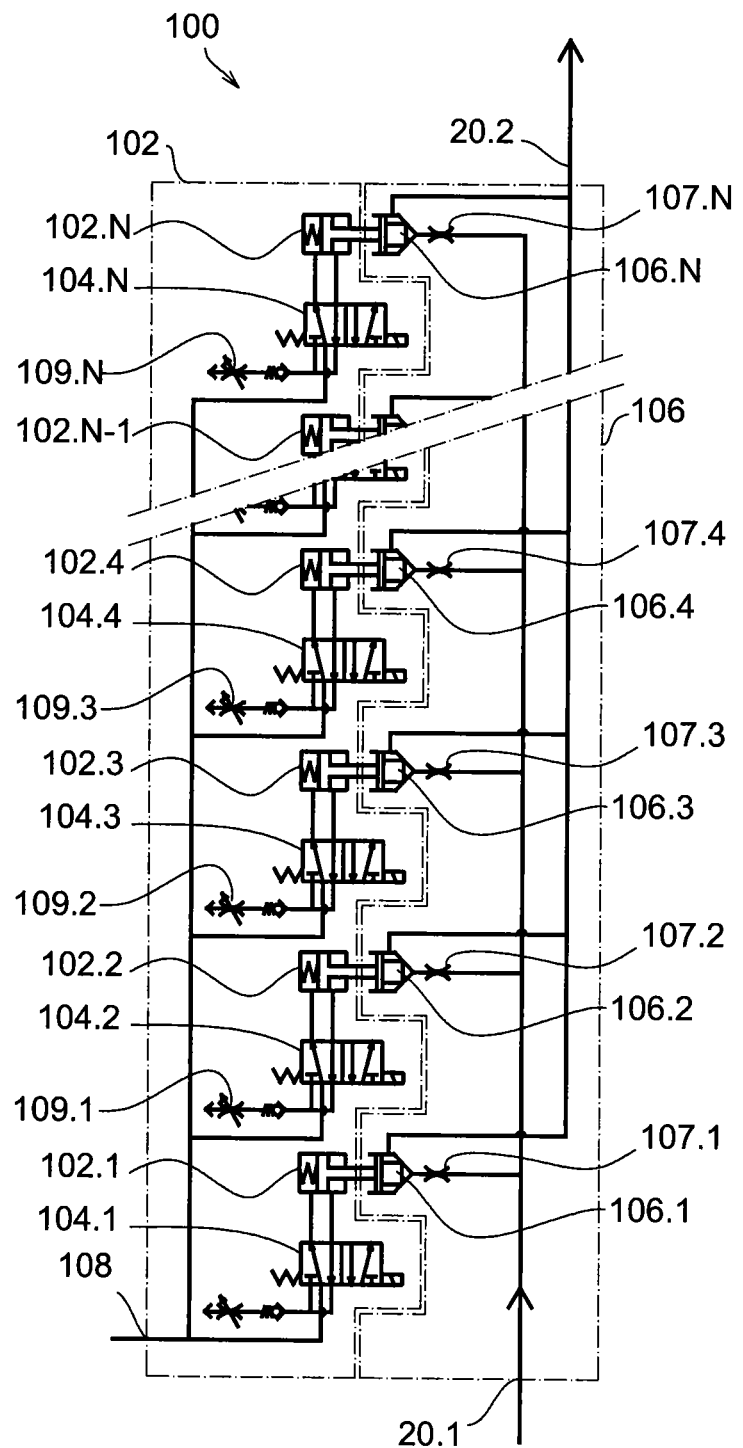
Figure 4:
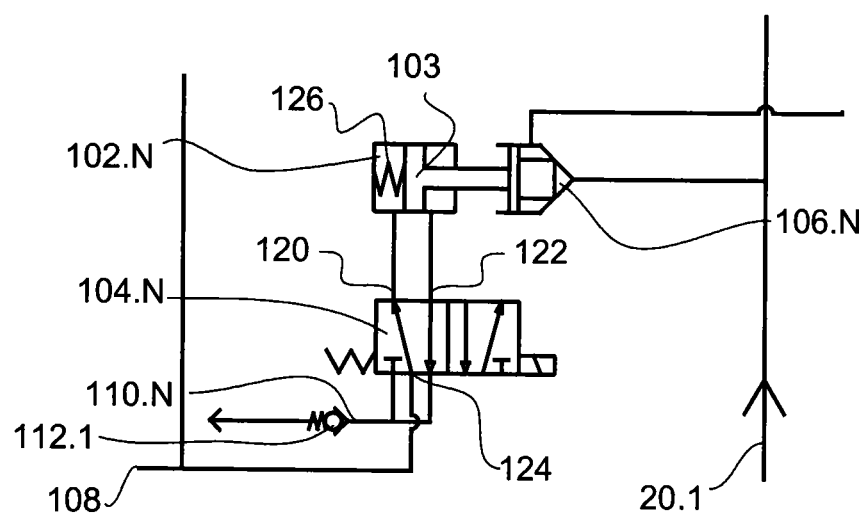

In the following, the invention will be described with reference to the accompanying exemplary, schematic drawings, in which FIG. 1 illustrates an internal combustion engine provided with a digital waste gate valve arrangement according to an embodiment of the invention, FIG. 2 illustrates a digital waste gate arrangement according to an embodiment of the invention, FIG. 3 illustrates a digital waste gate arrangement according to an embodiment of the invention, and FIG. 4 illustrates pneumatic actuator system according to an embodiment of the invention.

DETAILED DESCRIPTION OF DRAWINGS in FIG. 1 there is schematically shown an internal combustion piston engine 12 and a combustion gas system 10 relating to the engine. The combustion gas system of internal combustion piston engine 12 includes a turbocharger unit 14 with a compressor part 16 and a turbine part 18 which is provided for controllably increasing the inlet air i.e. charge air flow into the engine by utilizing the energy of the exhaust gas.

The gas system 10 of includes a main gas channel which in this embodiment includes an exhaust gas passage 20 and an inlet air passage 30. The exhaust gas passage 20 is at its first end in connection with the exhaust manifold 24 of the engine and further with the cylinders 26 of the engine. The conduit passage may be for example a pipe. In the cylinders the pressure and temperature of the exhaust gases is increased by means of combustion of fuel in the cylinders of the engine as is known as such. The engine is provided with a turbocharger unit 14. The exhaust gas passage 20 is connected at its second end to the inlet of the turbine part 18 of the turbocharger unit 14 in which turbine part energy of the exhaust gas is partially used for driving the compressor part 16. The compressor part 16 is connected to the inlet air passage 30 comprising an inlet manifold 28 of the engine via which the combustion air is distributed to the cylinders of the engine. The turbocharger unit 14 may be of a type known as such. Additionally, the turbocharger unit may have several stages in the turbine and/or compressor part. The gas system 10, particularly the turbocharger unit 18 is provided with a bypass channel 20', which controllably connects the inlet side of the turbine part 18 to the outlet side of the turbine part 18.

The bypass channel 20' is provided with a digital waste gate arrangement 100 for controlling gas flow through the bypass channel 20'. The valve arrangement 100 is arranged so that its inlet 20.1 is connected to the upstream side of the turbine part 18 and its outlet 20.2 is connection to the downstream side the turbine part 18. Thus depending of the operational status of the digital waste gate arrangement 100 a portion of the exhaust gas may be arranged to bypass the turbine part 18. Thus the valve arrangement 100 is and operates as a waste gate of the turbo charger unit 14.

The digital waste gate arrangement 100 further comprises a flow control unit 106 arranged between the inlet and the outlet 20.1, 20.2 of the arrangement. The digital waste gate arrangement 100 comprises also a pneumatic actuator system 102. The flow control unit 106 is in operational connection with a pneumatic actuator system 102 so that the pneumatic actuator system actuates the valve units of the flow control unit 106 according to a control signal from a process control unit 40. There is at least one control gas inlet port 108 in connection with the pneumatic actuator system 102, which is arranged in connection with a downstream side of a compressor part 14 of the turbocharger via a control gas passage 22. In this manner the charge air of the engine is used as control gas for the pneumatic actuator system 102. The gas inlet port 108 may be arranged to open into the inlet air passage 30 in downstream side of a charger air cooler 15 of the engine 12, even directly into the inlet manifold. In the inlet manifold possible pressure fluctuation of the charge air caused by the compressor part is minimized. Also, the charge air after the air cooler is at better suitable temperature for control air. As depicted by the dotted line 22' the gas inlet port 108 may also be arranged to open into the inlet air passage 30 in upstream side of a charger air cooler 15 but downstream the compressor part 16. The control gas for operating the flow control unit 106 is arranged available for the pneumatic actuator system 102 through said control gas passage 22. It should be noted that even if not shown in the figure the bypass channel 20', waste gate 100, and the control gas passage 22 may be integrated into the turbo charger 14.

With this arrangement while the engine is operated, charge air is pressurized by the compressor part 16 and pressurized charge air is used as a control gas operating the pneumatic actuator system 102 of the digital waste gate arrangement 100.

In the flow control unit 106 the digital waste gate arrangement consists of a number of valve units in parallel in respect to the gas flow. Each valve unit has a flow coefficient which may be for example a binary multiple of that of the other valves. For example, the digital waste gate arrangement may consist of a group of four valve unit. In that case the first valve unit has a flow coefficient of 1, the second valve unit has a flow coefficient of 2, the third valve unit has a flow coefficient of 4, and the fourth valve unit has a flow coefficient of 8. Each of these valve units would be operated independently by the pneumatic actuator. According to a preferred embodiment of the invention all the valve units of the arrangement 100 are arranged to be controlled responsive to a same control signal by the process control unit 40. Such a control signal may be based on single measurement value of the engine's operation, or it may be generated by utilizing a number of measurements.

An embodiment of the digital waste gate arrangement 100 is shown in FIG. 2 in more detailed manner. The flow control unit 106 of the digital waste gate arrangement 100 comprises more than two individually controllable on-off valve units 106.1-106N coupled parallel with each other between the inlet 20.1 and the outlet 20.2. The combined operational status of the valve units defines the operational status of the digital waste gate arrangement 100. The pneumatic actuator system 102 is arranged to control individually each of the on-off valve units 106.1-106.N. Thus the pneumatic actuator system 102 comprises a dedicated pneumatic actuator 102.1-102.N for each valve unit. Each pneumatic actuator 102.N is connected to a control system 1041-104.N dedicated for each actuator. The control gas inlet port 108 in connection with each of control systems 104.1-104.N of the pneumatic actuators so that the control gas is made available to each pneumatic actuator in order to operate it. Each of the control systems 104.1-104.N is also provided with a control gas discharge port 110.1-110.N via which the used control gas may be purged e.g. to the atmosphere. According to an embodiment of the invention the operation of the arrangement may be improved so that by the control gas discharge port is connected to or provided with a check valve 112.1-112.N. The check is advantageously arranged to have an opening threshold pressure meaning that the pressure must rise to a predetermined level before the check valve starts open. This way there is always a certain predetermined pressure level in the pneumatic actuator. Preferably the threshold pressure of the check valve is selected so that the pressure in the pneumatic actuator is higher than the pressure of the exhaust gas in the valve units. This minimizes leaking exhaust gas flow from the exhaust side to the actuator system.

In the figures there is shown a 5/2-type solenoid valve as the control system 104.1-104.N but similar operation or function may be realized in many ways being apparent to those skilled in the art.

In FIG. 3 there is shown a digital waste gate arrangement 100 which is otherwise similar to that shown in FIG. 2 but there are shown two additional features, one or both of which may be used to modify the embodiment shown in FIG. 2. Firstly, all the valve units are identical but they are provided with an exchangeable throttle part 107.1-107.N for setting the flow coefficient of the individual valve unit. Preferably the coefficient is a binary multiple of that of the other valves. Secondly, there is also shown an adjustable throttle unit 109.1-109.N in the control gas discharge port 110.1-110.N of each control system 104.1-104.N. By means of the adjustable throttle unit the flow rate of the discharged gas may be controlled which in turn effects on the operating speed of the pneumatic actuator.

In FIG. 4 there is shown one pneumatic actuator system 102 of the arrangement 100. The pneumatic actuator system 102 is a piston actuator in which a piston 103 connected to the valve unit 106.N. As explained above it comprises the control system 104.N arranged for the pneumatic actuator 102.N. The control system 104.N is provided with at least two control ports 120, 122 and an inlet port 124. The inlet port 124 of the control system 104.N is in flow connection with the control gas inlet port 108. The control system 104.N is arranged for setting a selectable flow connection between the inlet port 124 and the control ports 120, 122. Thus, the inlet port 124 is arranged either in flow connection with the first control port 120 or with the second control port 122 which rules the flow direction of control gas into and out of the actuator. As can be seen from the FIG. 4, the first and the second control ports 120, 122 for the pneumatic piston actuator 102.1 are connected with opposite sides of the piston 103 of the actuator. Thus the setting the flow connection the at least one inlet port 124 and the control ports defines the direction of movement of the piston of the actuator.

Respectively the control gas discharge port 110.N is arranged to be controllably set by the control system 104.N in a selectable flow connection to one of the control ports 120, 122 of said pair of two control ports. The results in operation in which pressurized control gas is led to one side of the piston 103 of the actuator and gas from the opposite side of the piston 103 of the actuator is led through the control system to the control gas discharge port 110.N. The pneumatic piston actuator according to an embodiment of the invention is arranged to operate with pressure level 0.5-10 bar.

In the FIG. 4 there is also depicted how according to an embodiment of the invention the pneumatic piston actuator comprises a spring 160 which is arranged to maintain the valve unit 106.N a when no control pressure is applied to the opposite side of the actuator piston 103.

While the invention has been described herein by means of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The details mentioned in connection with any embodiment above may be used in connection with another embodiment when such combination is technically feasible.

The invention claimed is:

1. A digital waste gate valve arrangement in an internal combustion piston engine comprising:
   at least one turbocharger with a compressor and a turbine,
   a flow control unit having including at least three controllable parallel on-off valve units,
   a pneumatic actuator system having at least three piston actuators;
      wherein each of the at least individually three controllable parallel on-off valve units is individually controlled by one piston actuator of the at least three piston actuators respectively;
   a control gas passage including a first port connected to the pneumatic actuator system;
      wherein the control gas passage branches from an inlet air passage at a downstream side of the compressor of the turbocharger and inlet air in the control gas passage is used as a control gas to operate the at least three individually controllable parallel on-off valve units of the flow control unit,
   at least three solenoid valves;
   wherein each of the at least three solenoid valves is configured to control the one piston actuator of the at least three piston actuators respectively;
   wherein the each solenoid valve of the at least three solenoid valves is provided with the first port, a second port, and a third port, wherein
  the first port is configured to supply the control gas to the each solenoid valve of the at least three solenoid valves;
  the second port is connected to a first chamber of the one piston actuator of the at least three piston actuators respectively; and
  a third port connected to a second chamber of the one the piston actuator of the at least three piston actuators respectively; and
wherein the each solenoid valve of the at least three solenoid valves is configured to set selectable flow connections between the first port and one of the second or third ports;
  wherein the first chamber and the second chamber are separated by a piston in the one piston actuator of at least three piston actuators respectively.

2. The digital waste gate valve arrangement according to claim 1, wherein the each solenoid valve of the at least three solenoid valves comprises a fourth port connected to a discharge passage to discharge the control gas.

3. The digital waste gate valve arrangement according to claim 2, further including a check valve being provided in the discharge passage.

4. The digital waste gate valve arrangement according to claim 3, wherein the check valve is arranged to have an opening threshold pressure.

5. The digital waste gate valve arrangement according to claim 3, wherein
  when the each solenoid valve of the at least three solenoid valves is in a first position, the fourth port is fluidly connected to the second port; and
  when the each solenoid valve of the at least three solenoid valves is in a second position, the fourth port is fluidly connected to the third port.

6. The digital waste gate valve arrangement according to claim 1,
  wherein the one piston actuator of the at least three piston actuators comprises a spring arranged to urge the piston towards a closing direction.

7. A method of operating a digital waste gate valve arrangement in an internal combustion piston engine having at least one turbocharger with a compressor and a turbine, and the digital waste gate valve arrangement positioned in a bypass passage bypassing the turbine of the turbocharger and including a flow control unit with at least three individually controllable parallel on-off valve units, a pneumatic actuator system with at least three piston actuators, at least three solenoid valves with a first port for supplying a control gas, a second port connected to a first chamber, and a third port connected to a second chamber, the method comprises:
  during an engine operation,
    operating each of the at least three individually controllable parallel on-off valve units of the flow control unit;
    actuating each of the at least three piston actuators of the pneumatic actuator system by pressurized charge air through a control gas passage branching from an inlet air passage at a downstream side of the compressor;
    controlling each of the at least three solenoid valves for controlling the each piston actuator of the at least three piston actuators respectively;
      wherein the step of controlling each of the at least three solenoid valves further includes:
        supplying the control gas to the each of the at least three solenoid valves via the first port;
        controlling to the each of the at least three solenoid valves to a first position;
          wherein the first position directs the control gas from the first port of the each of the at least three solenoid valves to the second port being connected to the first chamber; and
        controlling the each of the at least three solenoid valves to a second position;
          wherein the second position directs the control gas from the first port to the third port being connected to the second chamber;
          wherein the first chamber and second chamber are separated by a piston of the each of the at least three piston actuators.

* * * * *